March 1, 1960     C. PALOMINO ET AL     2,927,148

HIGH VOLTAGE TRANSMISSION LINE TOWER

Filed Oct. 5, 1956

Carlos Palomino
José V. Schmill
INVENTORS

BY
Kimmel & Crowell
Attorneys

United States Patent Office 2,927,148
Patented Mar. 1, 1960

2,927,148

HIGH VOLTAGE TRANSMISSION LINE TOWER

Carlos Palomino and José V. Schmill, Mexico City, Mexico

Application October 5, 1956, Serial No. 614,265

3 Claims. (Cl. 174—45)

The present invention relates generally to supporting towers for high voltage transmission lines, and more particularly to devices for avoiding breakdown of insulator strings suspended from such towers, due to high voltage surges such as are caused by lightning strokes, or similar atmospheric disturbances, and switching operations.

In the art pertaining to the transmission of electrical power at high voltage, steel, wooden towers or towers made of any other material like concrete, etc. are normally employed, which include cross bars from which are suspended insulator strings, which in turn support metallic conductors, to insulate the conductors from the towers and hence from ground. The insulator strings are normally designed in view of the voltage of the conductors, being at least adequate to insulate these from the tower with a reasonable margin of safety. However, it is necessary to protect the lines against extremely high voltages due to lightning or other surges, and to this end a greater number of insulators is employed in each string than is required merely to assure insulation from line to ground for the voltage of the line. The insulating ability of the additional insulators is selected to withstand an impulse higher than may be expected due to surge current passing through ground resistance at the footing or grounding of the towers, as well as maximum value of lightning current which experience indicates is likely.

It has been found, in practice, that lines insulated in accordance with the prior art practices above briefly outlined suffer an unexpectedly large number of outages. The reason for this is, according to the present invention, to be found in the fact that surge voltages which cause failures, by flashover of insulators, are to be calculated and predicted in terms of the surge impedance, or characteristic impedance of the steel tower considered as a transmission line or grounding wire or cable of the wooden tower or tower of any other material. When so predicted it may be shown that surges occur in ways heretofore unexpected, and may be protected against in a simple yet highly effective manner, in the light of correct theory.

It is, accordingly, a primary object of the present invention to provide a novel system for the protection of transmission line insulators from flashover.

It is another object of the invention to provide a system of protecting transmission line insulators against flashover which shall enable reduction in the cost of erecting transmission lines by reducing the number of insulators per string.

A further object of the invention resides in the provision of lightning proof transmission lines.

The above and still further objects, features and advantages of the present invention will become apparent upon consideration of the following detailed description of one specific embodiment thereof, especially when taken in conjunction with the accompanying drawings, wherein.

Briefly describing a preferred embodiment of the present invention, gaps are provided at selected points of a transmission line tower, which are subjected to no voltage gradient therebetween in the absence of lightning flashes. The gaps may consist of lightning arresters, may be of fixed or of adjustable spacing, and may be made of a variety of materials, provided only that they be designed to flash over at a lower voltage than the peak voltage of the insulator strings employed, in response to surges of the type against which protection is to be afforded. The locations of the gaps may be those for which high voltage peaks occur due to the transmission line characteristics of the tower itself, and of its cross arms, i.e., for those locations along and about the tower at which the tower and its cross arms appear as open circuit terminations of a transmission line, it being known that an open circuit termination of a transmission line may, due to reflection of voltage, be subjected to far higher voltages than is the sending end.

Figure 1:
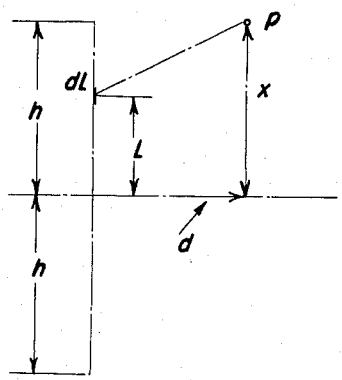
Figure 1 is a diagram on which mathematical derivations are predicated.

Analyzing the electric field due to a distributed charge Q along a straight line of length $2h$ (Fig. 1), the charge density per unit length is (1) $$q = \frac{Q}{2h}$$

Consider an element of length $dl$. Its charge will be $q.dl$ and the potential due to it at a point P is:

(2) $$d\phi = \frac{q.dl}{\beta} \cdot \sqrt{\frac{1}{d^2 + (1-x)^2}}$$

The potential at point P is, by integration:

(3) $$\phi = \frac{Q}{\beta.2h} \log_e \frac{h-x+\sqrt{d^2+(h-x)^2}}{-h-x+\sqrt{d^2+(-h-x)^2}}$$

As a check of this solution, in the limit, for a point at infinity:

(4) $$\lim_{x \to \infty} \phi = \frac{Q}{\beta.2h} \log_e \frac{x-h}{x+h} \approx \frac{Q}{\beta.2h} \cdot \frac{1}{x}$$

which is the potential of a point charge at the origin.

The solution (3) is valid irrespective of the position of the plane of P and $2h$, so that the equipotential surfaces are symmetrical about $2h$ as an axis, i.e., they are surfaces of revolution.

They can be determined by putting:

(5) $$\frac{h-x+\sqrt{d^2+(h-x)^2}}{-h-x+\sqrt{d^2+(-h-x)^2}} = \text{constant} = K$$

Equation 5 represents ellipsoids of revolution, as can be ascertained by expressing the equation in the parametric form of the ellipse, where:

(6) $$x = a.\cos\alpha;\ d = b.\sin\alpha;\ b^2 = a^2 - h^2$$

We obtain then:

(7) $$h - x + \sqrt{d^2 + (h-x)^2} = (a+h)(1-\cos\alpha)$$

Substituting $h$ for $-h$ in the former expression we obtain:

(8) $\quad -h-x+\sqrt{d^2+(-h-x)^2}=(a-h)(1-\cos\alpha)$ and therefore from (5)

(9) $\quad K=\dfrac{a+h}{a-h}$

(10) $\quad a=h\dfrac{k+1}{k-1}$ and from (6)

(11) $\quad b=h\dfrac{2\sqrt{K}}{k-1}$

The eccentricities of the ellipses are given by the expression

(12) $\quad e=\dfrac{k-1}{k+1}=\dfrac{h}{a}$

Therefore the potential of the finite uniformly loaded line corresponds with an ellipsoid of revolution.

We may consider a transmission structure generally as an equipotential surface and for all practical purposes as a long ellipsoid of revolution coinciding with one of the equipotential surfaces, which can be substituted by a metallic surface (being equipotential).

Let $a$ be the length (semi-major axis of the ellipse) and $b$ the mean radius of the tower. We have now:

(13) $\quad a^2=h^2+b^2$ and for a very oblate ellipsoid we can accept:

(14) $\quad a=\sqrt{h^2+b^2}\approx h+\dfrac{1}{2}\dfrac{b^2}{h}$ quite accurately.

Since the potential over all the ellipsoid is constant, it is possible to calculate the potential at any of its points. Taking $x=0$; $d=b$ (semi-minor axis) we obtain from (3) and (14):

(15) $\quad \phi_1=\dfrac{Q}{\beta\cdot 2h}\log_e\dfrac{h+\sqrt{b^2+h^2}}{-h+\sqrt{b^2+h^2}}\approx\dfrac{Q}{\beta\cdot h}\cdot\log_e\dfrac{2h}{b}$ Considering a very oblate ellipsoid the solution (15) is very accurate.

The capacity of this ellipsoid is:

(16) $\quad C=\dfrac{Q}{\phi_1}=\beta\,\dfrac{h}{\log_e\dfrac{2h}{b}}$

As can be observed, the capacity is mainly influenced by the length and the influence of the width is minor as it appears in the logarithmic term. The capacity for unit length is:

(17) $\quad c=\dfrac{C}{2h}=\dfrac{\beta}{2\log_e\dfrac{2h}{b}}$

Let us now calculate the surge impedance:
Inductance per unit length is given by:

(18) $\quad L.c=\dfrac{1}{v^2}=\gamma.\beta$ in which $v$ is the velocity of light ($\beta$ and $\gamma$ are dimensional constants) so

(19) $\quad L=\dfrac{\gamma.\beta}{c}=2\gamma\log_e\dfrac{2h}{b}$

The surge or characteristic impedance is given by the well known equation:

(20) $\quad Z_0=\sqrt{\dfrac{Z}{y}}=\sqrt{\dfrac{l}{c}}$

Now

(21) $\quad \beta=\dfrac{1}{9\times 10^9}$ and $\gamma=10^{-9}$

Therefore

(22) $\quad Z_0=\sqrt{\dfrac{\gamma}{\beta}}\cdot 2\log_e\dfrac{2h}{b}$ or

(23) $\quad \left|Z_0=60\log_e\dfrac{2h}{b}=138\log_{10}\dfrac{2h}{b}\right|$

Figure 2:
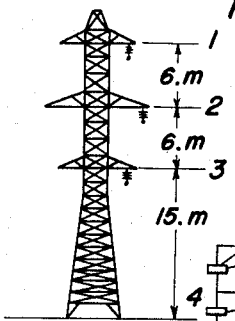
Figure 2 is a view of a transmission line tower, showing certain dimensions, for purposes of calculating performance.

Suppose a tower as in the Figure No. 2 and calculate the potential difference which will result in the different elements when a lightning stroke say of 20,000 amps. strikes the top of the tower, and passes through the tower to ground. The potential difference is given by Figure 2

$$V=Z_0.I$$

where $Z_0$ is the surge impedance in any portion of the tower and V the voltage across that portion. As the lightning strikes the top we will establish the following tabulation.

|  | $h$ | $\dfrac{2h}{b}$ | $\log_{10}\dfrac{2h}{b}$ | $Z_0$ | Kv. |
|---|---|---|---|---|---|
| Distance between 1 and 2 | 6 | 16 | 1.203 | 166 | 3,320 |
| Distance between 1 and 3 | 12 | 32 | 1.504 | 207 | 4,140 |
| Distance between 1 and 4 | 27 | 72 | 1.856 | 256 | 5,120 |

The above calculations indicate that the greatest potential drop, as the wave advances, occurs between points 1 and 2, since between points 2 and 3 there will be a potential drop of 4140−3320=820 kv. when the wave progresses that far. So if the line is at a potential of say 80 kv. at the beginning, the dead side of the insulator string will rise to 3320 kv. and, therefore, the potential on the line will be 3320±80 kv., which will cause the second string of insulators to flash over. Most of the energy of the stroke will be dissipated there and the harmful effect will be further diminished when the wave reaches the lowest string of insulators.

The surge impedance of the cross arms should also be taken into account. The phenomenon involved may be explained roughly in the following way: When the wave strikes the tower and travels down, the voltage is increased as per curve A. When it reaches the footing, at B, it starts to drop to 0, attaining that value in the footing resistance, R, i.e., between B and true ground G. A reflected wave C travels back when the first wave reaches point B and builds up a voltage of opposite sense, wave C opposing wave A and reaching asymptotically to the value of the potential due to current flow in the footing resistance.

There will be several waves down and up till this final condition is reached, as at D.

In the above calculations, the dimensions assigned to the tower are arbitrary and the example calculated is not intended to be limiting in any sense; but is cited to exemplify the principles involved.

Having thus evaluated the differences of potential which appear at various points of a metallic structure or conductor when struck by a lightning surge, and having ascertained that it is due to these large potential differences that the insulators of the lines, suspended from the towers, fail. We install gaps, lightning arresters, valves, etc., of such nature as to permit a surge discharge at a voltage less than the maximum impulse voltage which the insulators or insulator strings are capable of withstanding the flashovers of insulators and therefore the failure of the line due to the surge being thus avoided by by-passing the surges.

In accordance with the invention, gaps of any sort may be distributed from top to bottom of the tower, or partially along the tower, installed at the same sides as the insulator strings or at quadrature to them, or at any angle with respect to the plane formed by the axis of the tower and the axis of the insulators or insulator strings, and at any distance from the tower to the outside or to the inside of it, to dissipate the energy of the stroke and deviate same to ground without interfering with the performance of the line. These remain neutral at ground potential, i.e., at the potential of the tower, when no surge electrical atmospheric disturbance exists.

Figure 3:
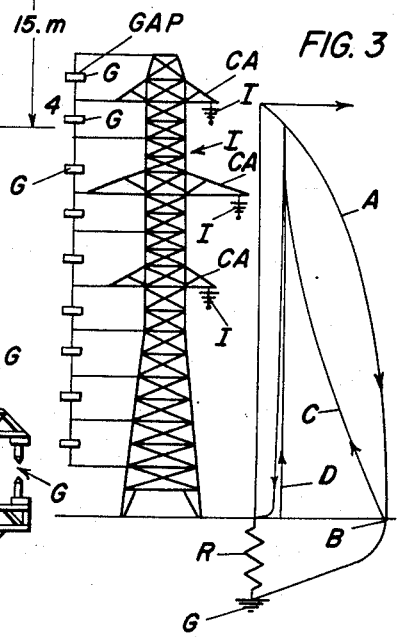
Figure 3 is a view in front elevation of a modification of a tower according to the invention, including a plot of voltages deriving from a current surge in the tower and its footings, and indicating protective features.

In Figure 3 is illustrated some preferred ways in which the gaps may be installed in actual towers, without intending to limit the scope of the basic idea, but merely as illustration. In this figure are shown diagrammatically gaps G, connected between separated points of a tower T, having cross arms CA, from which are suspended insulator strings I, in a configuration appropriate, for example, to a three phase power line. The break-down voltages across the gaps are selected or adjusted to be smaller than the voltages generated along the tower T, at which the gap terminals are connected, in response to a normal or usual surge due to lightning or the like.

Figure 4:
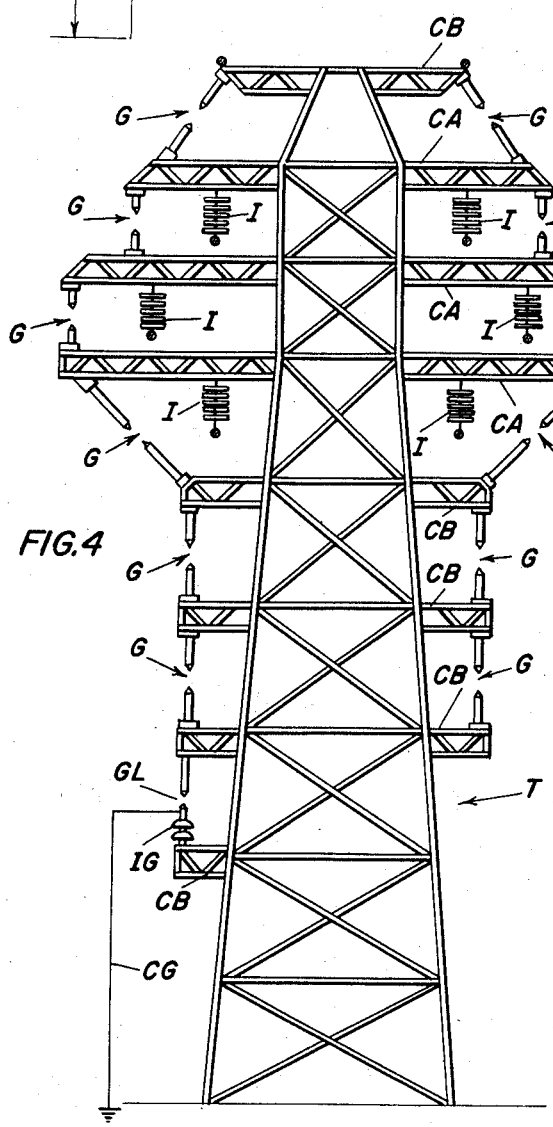
Figure 4 is a view in plan of a further modification of a transmission line tower, with protective features, according to the invention.

In Figure 4 is illustrated in greater detail a specific and preferred embodiment of the present invention, in which tower T is supported on suitable footings, represented as ground. In the normal tower the cross arms CA extend to the points where the insulator strings I are suspended. In accordance with the present invention the cross arms CA are extended beyond the points at which the insulators are suspended for a considerable distance. The gaps G are secured to the outward terminations of the cross arms CA and further cross arms CB are provided, which do not support insulator strings, but only gap elements, the arrangement being in general that each of cross arms CA or CB supports two gap elements, one extending generally downwardly toward a gap element of an adjoining cross arm, and one extending generally upwardly toward a gap element of an adjoining cross arm.

The lowermost gap GL includes a lower element which is directly connected to an independent ground via a conductor CG, and is insulated by means of an insulator IG from the associated cross arm CB. Thereby protection is afforded against the high voltage which is normally developed across the footing resistance R, this voltage being shunted to the independent ground via the lowermost pair of gaps GL.

Figure 5:
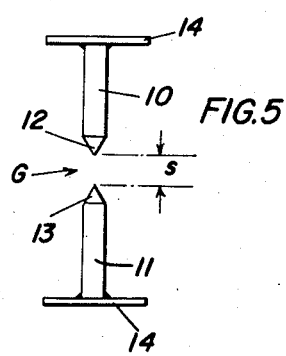
Figure 5 is a view in front elevation of discharge electrodes employed in the practice of the invention.

Reference is now made to Figure 5 of the accompanying drawings, wherein is illustrated a typical gap structure. The gaps may be formed of two metallic cylindrical elements 10 and 11, which may be hollow or solid as desired, and the opposed ends of which are co-axial and pointed, as at 12, 13. The distance S between the points is selected to afford a breakdown voltage smaller than will appear due to a lightning surge capable of breaking down any insulator string across the adjoining section of tower T. The cylindrical elements 10, 11 may be welded to base plates, 14, which in turn may be secured to the cross arms, as by welding, bolting or the like.

In more accurate parlance, the gaps must break down at a lower voltage than will the insulator strings employed, it being non-essential that the gaps actually discharge if the surge is sufficiently small that the insulator strings will not break down, but essential that a gap at any position along the tower break down or discharge at a lower voltage than can be withstood by the insulator string it is intended to protect. Gaps may be applied, too, along wooden or other structures for transmission lines connecting these gaps electrically with the grounding cables along the towers. They should be appropriately spaced so that they will adequately protect the insulator strings.

While we have described and illustrated one specific embodiment of our invention, it will be clear that variations of the general arrangement and of the details of construction which are specifically illustrated and described may be resorted to without departing from the true spirit and scope of the invention as defined in the appended claims.

What we claim is:

1. In combination, a metallic tower, a plurality of metallic cross arms secured in stepped relation along said tower, insulator strings secured to selected ones of said cross arms, each insulator string supporting a transmission line and having a predetermined flash-over voltage, said insulator strings each secured inwardly of the end of one of said cross arms, and a discharge gap connected between adjacent ones of each pair of said cross arms adjacent the outward ends thereof, wherein said discharge gaps are arranged to discharge in response to predetermined voltages $V=Z_0I$, where $Z_0$ is the surge impedance of the tower and cross arms as seen between the elements of a gap and I is the current of a lightning surge passing along said tower, and wherein the voltages V are lower than the flashover or breakdown voltages of insulating strings in shunt to the gap.

2. In combination, a transmission line tower including at least one conductor substantially coextensive with the length thereof, a plurality of cross arms secured in vertically stepped relation along said tower, at least one conductor coextensive with the length of each of said cross arms, each insulator string supporting a transmission line and having a predetermined flash-over voltage, said insulating strings each secured inwardly of the end of one of said cross arms, and a discharge gap between adjacent ones of pair of said cross arms adjacent the outward ends thereof, wherein said discharge gaps are arranged to discharge in response to predetermined voltages $V=Z_0I$ where $Z_0$ is the transmission line surge impedance of the conductors connected with the elements of the gap, and I is the current due to a lightning surge passing along at least one metallic conductor, and wherein the voltages V are lower than the flash or breakdown of insulating strings in shunt to the gap.

3. In combination, a transmission tower mounted on a footing, said transmisison tower including at least one metallic conductor substantially coextensive with the length thereof, said transmission tower mounted on a footing having a predetermined relatively high resistance R, said footing being electrically connected with one end of said at least one metallic conductor, a discharge gap having two spaced conductive elements, means connecting one of said elements directly to said at least one metallic conductor, means for insulatively securing the other of said elements to said tower, and a low resistance connection from said other of said elements to a ground point, whereby voltage generated in said resistance R by current flow due to a high amplitude transient is, if above a predetermined value, shunted to said ground point, said discharge gap being arranged to discharge in response to at least a predetermined voltage $V=Z_0I$, where $Z_0$ is the surge impedance of said at least one metallic conductor considered as a transmission line and taken between said gaps and I is surge current due to a lightning surge passing along said one metallic conductor, and wherein V is less than the breakdown voltage existing between said adjacent points in response to said lightning surge.

References Cited in the file of this patent

UNITED STATES PATENTS

| 1,705,104 | Woodruff et al. | Mar. 12, 1929 |
| 1,863,080 | Austin | June 14, 1932 |
| 1,876,577 | Austin | Sept. 13, 1932 |

FOREIGN PATENTS

| 178,129 | Austria | September 1953 |